United States Patent Office 3,167,879
Patented Feb. 2, 1965

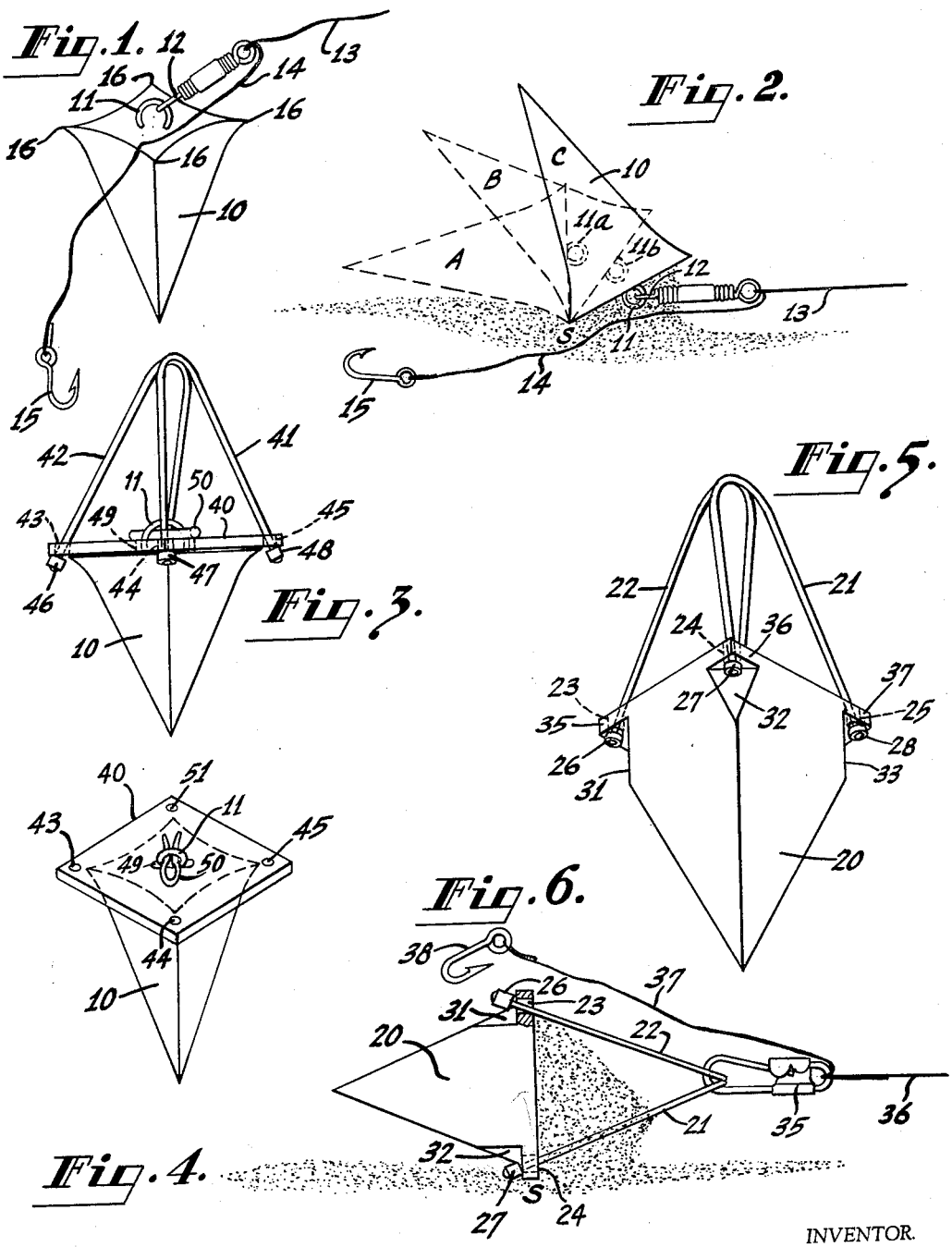

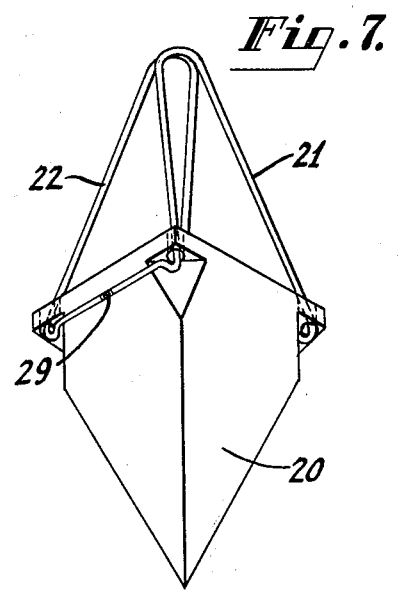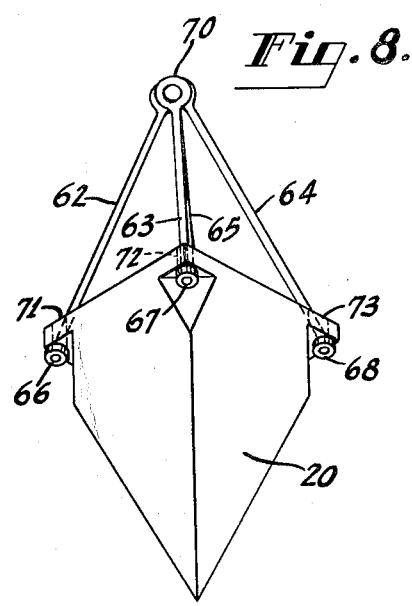

3,167,879
FISHING DEVICES
George L. Beers, 410 Peyton Ave., Haddonfield, N.J.
Filed July 19, 1963, Ser. No. 296,204
6 Claims. (Cl. 43—44.96)

This invention relates to an improved sinker which is particularly suitable for surf fishing. In surf fishing the sinker serves two basic purposes. The first function is that of transporting the baited hook or hooks and the line a sufficient distance from the shore so that fish may be attracted by the bait and caught. This is accomplished by means of energy stored in the sinker through the act of casting. To achieve the maximum distance in surf-casting the weight or mass of the sinker must be related to the stiffness or flexibility of the rod which is used. If the casting rod is either too stiff or too flexible for the weight of the sinker the distance achieved by the surf caster will be substantially reduced. The weight of the sinker, however, must be adequate to carry the baited hook and line the desired distance.

Another sinker requirement from the standpoint of achieving maximum distance in surf casting is that the sinker be reasonably streamlined and that it does not tend to flutter or oscillate so that it offers a minimum resistance to its travel through the air. It is obvious that the wind resistance contributed by the baited hook and the line will also be a factor in determining the distance achieved by the surf caster.

The second function of the sinker is to hold the baited hook or hooks at the location to which it has been cast until a fish has been caught or the fisherman desires to retrieve it. This second function of the sinker introduces additional requirements which are not entirely consistent with the first function. The fisherman generally desires to keep some tension on the line so that he will be aware of a fish picking up the bait. On a windy day the action of the wind and waves on the line cause a pull on the sinker which is frequently sufficient to dislodge it and the baited hook, sinker and line will gradually wash up on the beach. Surf fishermen using conventional casting reels most frequently use "pyramid" sinkers weighing four ounces. Those using reels of the "spinning" variety in which a relatively light "monofilament" line is employed may use sinkers of two or three ounces. When the wind and waves are such that the sinker which the fisherman is using will not hold the baited hook in the desired position the fisherman resorts to a heavier sinker. Under unfavorable conditions it is not uncommon for surf fisherment to resort to sinkers weighing 6 or 8 ounces. These heavy sinkers make casting much more difficult and frequently prevent the fisherman from determining when a fish has picked up the bait.

An important object of this invention is to provide a sinker which will have substantially greater holding capability than conventional sinkers of the same weight.

Another object of the invention is to provide a sinker which will not overturn with a bouncing action when retrieved.

Another object of the invention is to provide a sinker in which the tendency to flutter or oscillate as the sinker travels through the air is minimized.

A further important object of the invention is to provide an adapter by which a conventional sinker can be converted to include the novel features of this invention so that its holding capability is substantially increased.

Other important objects of the invention will be apparent from the disclosures in the accompanying drawing and following specification.

In the drawing:

FIG. 1 shows a perspective view of a conventional sinker of the "pyramid" type.

FIG. 2 illustrates the limited holding capability of the sinker of FIG. 1.

FIG. 3 is a side view of an adaptor attached to the sinker of FIG. 1 to provide the sinker of FIG. 1 with the novel features of this invention so that its holding capability can be greatly increased.

FIG. 4 is a perspective view showing the manner in which the adaptor of FIG. 3 is attached to the sinker of FIG. 1.

FIG. 5 is a sinker incorporating the novel features of this invention.

FIG. 6 is a side view of the sinker of FIG. 5 attached to a fishing line and illustrating the greatly increased holding capability of the sinker of FIG. 5 over those of conventional types.

FIG. 7 is a modification of the sinker of FIG. 5.

FIG. 8 is another modification of the sinker of FIG. 5.

Referring to FIG. 1 a "pyramid" sinker 10 is provided with an attachment loop 11 to which a fishing line 13 is attached through the swivel device 12. A conventional fish hook 15 is also attached to the line 13 through the leader 14. The "pyramid" sinker as the name implies is in the form of a pyramid. The sinker 10 of FIG. 1 is a popular form of the pyramid sinker in which the four corners designated by the numeral 16 have been flared outwardly from a straight sided pyramid. The pyramid sinker in the most popular sinker in use by surf fisherman. Pyramid sinkers are generally molded of lead with an attachment loop of brass wire.

FIG. 2 illustrates the limitations in the holding capability of the conventional pyramid sinker. When the surf casting operation has been concluded and before any tension has been applied to the line 13 the sinker assumes a position represented by the dotted outline A. One edge of the sinker as represented by any two of the corner designated 16 in FIG. 1 rests in the sand at the point S. It will be apparent that any force applied through the fishing line to the attachment loop 11a by either the fisherman or the action of the wind and waves on the fishing line tends to rotate the sinker in a clockwise direction about the point S. As the force applied to the sinker through the fishing line increases the sinker may assume a position shown by the dotted outline B in which the attachment loop is designated 11b. When the force applied to the sinker through the fishing line is sufficient to raise the center of gravity of the sinker to a point directly above S the sinker topples over as indicated by the solid outline C. If this force on the line 13 is maintained the sinker moves in the direction of the fishing line and continues to topple over in an erratic manner. If the force causing the sinker to topple over is due to the action of the wind and waves the sinker and baited hook will ultimately come to rest on the beach at the edge of the water. A basic limitation of the holding capability of the conventional pyramid sinker is the relatively small force which is required to raise the center of gravity of the sinker to the point where it topples over.

FIG. 5 shows a sinker incorporating the features of this invention which overcomes the limitations in holding capability of the conventional sinker previously discussed. The sinker 20 in FIG. 5 may be of substantially the same shape as the sinker 10 of FIG. 1. The four corners of the sinker (one corner not shown in FIG. 5) are cut away as indicated by the numerals 31, 32 and 33 to leave the corresponding flanges 35, 36 and 37. Apertures 23, 24 and 25 are provided through the flanges 35, 36 and 37. Two U-shaped semirigid wires or members 21 and 22 are inserted through the apertures 23, 24 and 25 in the corner flanges 35, 36 and 37. As shown in FIG. 5 the semirigid U-shaped member 21 is inserted through apertures 24 and 25 in the flanges 36 and 37. Attached to the ends of the semirigid member 21 are beads or washers 27 and 28. The apertures 24 and 25 are substantially larger than the semirigid member 21 so that the semirigid member 21 can move freely through the apertures. The beads or washers 24 and 25 prevent the semirigid member 21 from being pulled back through the apertures so that the sinker can be supported by the semirigid member 21 and the semirigid member 22 which is a duplicate of the semirigid member 21 but passes through the aperture 23 and the aperture not shown in the drawing. The semirigid members 21 and 22 may be of any suitable material such as stainless steel, brass or bronze or any other material which is relatively unaffected by salt water. The beads or washers 26, 27 and 28 may be attached to the semirigid members 21 and 22 by any of the well known methods such as soldering, welding or crimping. If desired the beads or washers can be omitted and the ends of the semirigid member formed in a loop such as used at the ends of the swivel device 12 in FIG. 1. The sinker 20 can be molded readily in the form shown in FIG. 5 or it can be machined from conventional sinkers such as the sinker 10 in FIG. 1. Since the semirigid members 21 and 22 are identical in length and shape and since they can move freely through the apertures in the sinker they can be brought together as shown in FIGS. 5 and 6 so that the fishing line may be attached to the sinker through the safety pin attachment device 35.

FIG. 6 shows the sinker 20 resting in the sand after it has been cast out from the shore and in a position analagous to the position A for the conventional sinker in FIG. 2. Let us assume that the sand at the point S in FIG. 6 is restraining the sinker 20 from moving in the direction of the fishing line. Any force applied to the sinker through the fishing line 36 cannot cause the sinker to rotate about the point S and topple over.

Assume for the purpose of illustration that the sinker 20 rotates slightly in a clockwise direction about the point S. It will be apparent that the semirigid member 22 will slide through the aperture 23 so that no force can be applied to the sinker through the fishing line which will cause it to rotate in a clockwise direction. Furthermore, if the sinker 20 rotated in a clockwise direction the portion of the semirigid member 22 which is looped through the opening in the safety pin attachment device 35 is also free to slide along the opening in the attachment device and likewise prevents any force from being applied to the sinker 20 which will cause it to rotate about the point S.

Thus regardless of the side on which the sinker 20 comes to rest the only force which can be applied to the sinker through the fishing line 36 is a force which maintains the sinker in substantially the position shown in FIG. 6. After the force applied through the line 36 exceeds a value which is substantially greater than that required to topple over the sinker 10 of FIGS. 1 and 2 the sinker 20 will move dragging sand before it. Thus the sinker 20 when retrieved by the fisherman reeling in the fishing line 36 will move toward the fisherman with a steady motion in contrast to the erratic toppling over of the sinker of FIGS. 1 and 2.

Should the sinker 20 encounter some rigid object on the ocean floor as it is being reeled in, the semirigid members 21 and 22 are so positioned in the four corners of the sinker that they act as sled runners to cause the sinker to ride up over the rigid object. However, the semirigid members, because of their relatively small cross section, do not prevent the sinker 20 from sinking into the sand when the sinker is at rest.

Another advantage of the sinker of FIGS. 5 and 6 is that the tendency of the sinker to flutter or oscillate as it travels through the air after being cast by the fisherman is minimized. The conventional sinker of FIGS. 1 and 2 as previously stated is attached to the fishing line through the attachment loop 11. Since the sinker of FIGS. 1 and 2 is effectively attached to the line at only a point at approximately the center of the large end of the sinker the small end of the sinker can be deflected by the air currents in such a way that the sinker tends to flutter as it travels through the air. The sinker of FIGS. 5 and 6, however, is attached to the line through the semirigid members extending through the four corners of the larger end of the sinker and the sinker is effectively stabilized and any tendency to flutter is minimized.

Referring to FIGS. 3 and 4 an adaptor is shown for coverting the sinker of FIG. 1 so that it can provide the superior holding capability and other advantages of the sinker of FIGS. 5 and 6.

A relatively thin plate 40 is provided with apertures 43, 44, 45 and 51 around its periphery. The semirigid members 41 and 42 extend through these apertures. Beads or washers such as shown shown at 46, 47 and 48 are attached to the ends of the semirigid members 41 and 42 where they extend through the apertures 43, 44, 45 and 51. The semirigid U-shaped members 41 and 42 are identical in length and shape and can move freely through the apertures 43, 44, 45 and 51. They can be brought together as shown in FIG. 3 so that the adaptor can be attached to a fishing line by means of an attachment device such as the safety pin device 35 shown in FIG. 6.

The plate 20 is provided with an aperture or slot 49 which is of such a size that the attachment loop 11 of the sinker 10 can be extended therethrough. With the attachment loop 11 extended through the slot 49 the plate 40 may be attached to the sinker 10 by inserting a retaining device such as the cotter pin 50 through the attachment loop 11. By this simple adaptor the conventional sinker 10 can be converted to have the advantages of the sinker 20 in FIGS. 5 and 6. The retaining device 50 is preferably made of a material which is unaffected by salt water when the sinker is to be used for salt water fishing. The sinker and adaptor combination shown in FIGS. 3 and 4 functions in the same manner as the sinker shown in FIGS. 5 and 6.

FIG. 7 shows a modification of the sinker of FIG. 5 in which the ends of the semirigid members 21 and 22 which extend through the apertures 23, 24, 25 and the one not shown in the drawing are bent so that they can be joined together by welding or soldering at a point 29 and a point on the other side of the sinker directly opposite the point 29. By this arrangement the members 21 and 22 are connected to form a continuous member passing through the apertures around the periphery of the sinker so that the retaining beads or washers 26, 27 and 28 are not required.

FIG. 8 shows another modification of the sinker of FIG. 5 in which the two U-shaped members 21 and 22 are replaced by four relatively straight semirigid members 62, 63, 64 and 65. The retaining beads or washers 66, 67 and 68 are attached to the semirigid members 62, 63 and 64 to prevent the semirigid members from being withdrawn through the apertures 71, 72 and 73. Each of the semirigid members is provided with an attachment loop as shown at 70 so that the sinker can be attached to the fishing line by means of an attachment device similar to the safety pin attachment device 35 shown in FIG. 6. The attachment device is passed through each of the four attachment loops on the semirigid members 62, 63, 64 and 65.

The sinkers of FIGS. 7 and 8 function in the same manner as the sinker of FIGS. 5 and 6. In each modification the semirigid members are free to move through the apertures around the periphery of the sinker.

It is obvious that the modifications shown in FIGS. 7 and 8 are also applicable to the adaptor of FIGS. 3 and 4. It is likewise apparent that a variety of retaining means can be used instead of the cotter pin 50 shown in FIGS. 3 and 4.

What is claimed:

1. A fishing sinker for attachment to a fishing line comprising a weighted body having one end substantially larger than the opposite end to minimize the resistance to the movement of said sinker through the air in one direction and to provide substantial resistance to the movement of said sinker through the sand at the bottom of a body of water in the opposite direction, said body having a plurality of apertures around the periphery of said larger end and having a central axis extending through said larger and smaller ends, said peripheral aperture being substantially parallel to said central axis, and means for attaching said body to a fishing line including a plurality of members each extending freely slidable through a different one of said apertures, said members being sufficiently rigid that they are not deformed by the forces normally applied to said sinker while fishing, means at the ends of said members for preventing the ends thereof from passing through said apertures and further means including a portion of each of said members adapted to be brought together for the attachment of a fishing line.

2. A fishing sinker for attachment to a fishing line comprising a weighted body having one end substantially larger than the opposite end to minimize the resistance to the movement of said sinker through the air in one direction and to provide substantial resistance to the movement of said sinker through the sand at the bottom of a body of water in the opposite direction, said body having a plurality of apertures around the periphery of said larger end and having a central axis extending through said larger and smaller ends, said peripheral apertures being substantially parallel to said central axis, and means for attaching said body to a fishing line including a plurality of U-shaped members each having one end extending freely slidable through a different one of said apertures, said U-shaped members being sufficiently rigid that they are not deformed by the forces normally applied to said sinker while fishing, means at the ends of said U-shaped members for preventing the ends thereof from passing through said apertures and means including a portion of each of said members adapted to be brought together for the attachment of a fishing line.

3. A fishing sinker for attachment to a fishing line comprising a weighted body having one end substantially larger than the opposite end to minimize the resistance to the movement of said sinker through the air in one direction and to provide substantial resistance to the movement of said sinker through the sand at the bottom of a body of water in the opposite direction, said body having a plurality of apertures around the periphery of said larger end and having a central axis extending through said larger and small ends, said peripheral apertures being substantially parallel to said central axis, and means for attaching said body to a fishing line including a plurality of members each extending freely slidable through a different one of said apertures, said members being sufficiently rigid that they are not deformed by the forces normally applied to said sinker while fishing, means at the ends of said members for preventing the ends thereof from passing through said apertures and further means including a portion of each of said members adapted to be brought together opposite said larger end and beyond the body of said sinker for the attachment of a fishing line.

4. A fishing sinker for attachment to a fishing line comprising a weighted body having one end substantially larger than the opposite end to minimize the resistance to the movement of said sinker through the air in one direction and to provide substantial resistance to the movement of said sinker through the sand at the bottom of a body of water in the opposite direction, said body having a plurality of apertures around the periphery of said larger end and having a central axis extending through said larger and smaller ends, said peripheral apertures being substantially parallel to said central axis, and means for attaching said body to a fishing line including a plurality of members each having one end extending freely slidable through a different one of said apertures, said members being sufficiently rigid that they are not deformed by the forces normally applied to said sinker while fishing, means at the ends of said members for preventing the ends thereof from passing through said apertures and means including a portion of each of said members adapted to be brought together opposite said larger end and beyond the body of said sinker for the attachment of a fishing line.

5. A fishing sinker for attachment to a fishing line comprising a weighted body having one end substantially larger than the opposite end to minimize the resistance to the movement of said sinker through the air in one direction and to provide substantial resistance to the movement of said sinker through the sand at the bottom of a body of water in the opposite direction, said body having a plurality of apertures around the periphery of said larger end and having a central axis extending through said larger and smaller ends, said peripheral apertures being substantially parallel to said central axis, and means for attaching said body to a fishing line including a plurality of members, each end of said members extending freely slidable through a different one of said apertures, said members being sufficiently rigid that they are not deformed by the forces normally applied to said sinker while fishing, means at the ends of said members for preventing the ends thereof from passing through said apertures and further means including a portion of each of said members adapted to be brought together opposite said larger end and beyond the body of said sinker for the attachment of a fishing line.

6. A fishing sinker for attaching to a fishing line comprising a weighted body having one end substantially larger than the opposite end to minimize the resistance to the movement of said sinker through the air in one direction and to provide substantial resistance to the movement of said sinker through the sand at the bottom of a body of water in the opposite direction, said body having a plurality of apertures around the periphery of said larger end and having a central axis extending through said larger and smaller ends, said peripheral apertures being substantially parallel to said central axis, and means for attaching said body to a fishing line including a plurality of members each extending through a different one of said apertures, said members being sufficiently rigid that they are not deformed by the forces normally applied to said sinker while fishing, means associated with said members for preventing said members from being withdrawn through said apertures and further means including a portion of each of said members adapted to be brought together for the attachment of a fishing line.

References Cited by the Examiner

UNITED STATES PATENTS

| | | | |
|---|---|---|---|
| 2,340,608 | 2/44 | Merle | 43—43.1 X |
| 2,592,664 | 4/52 | De Mello | 43—43.1 |
| 2,601,737 | 7/52 | Neja et al. | 43—44.96 |

ABRAHAM G. STONE, *Primary Examiner.*